(12) United States Patent
Varela et al.

(10) Patent No.: US 8,165,183 B2
(45) Date of Patent: Apr. 24, 2012

(54) JOINT DESIGN

(75) Inventors: Bill Varela, Parma Heights, OH (US);
Michael Frastaci, Parma, OH (US)

(73) Assignee: GrafTech International Holdings, Inc., Parma, OH (US)

( * ) Notice: Subject to any disclaimer, the term of this patent is extended or adjusted under 35 U.S.C. 154(b) by 1501 days.

(21) Appl. No.: 11/280,946

(22) Filed: Nov. 16, 2005

(65) Prior Publication Data

US 2007/0110120 A1    May 17, 2007

(51) Int. Cl.
*H05B 7/06* (2006.01)
*H05B 7/12* (2006.01)
(52) U.S. Cl. .................... 373/92; 373/88; 373/95
(58) Field of Classification Search ............ 373/92, 373/90, 91, 93–95, 97, 98, 88, 60; 228/164; 403/267, 296, DIG. 5; 285/915; 439/194
See application file for complete search history.

(56) References Cited

U.S. PATENT DOCUMENTS

| | | | | |
|---|---|---|---|---|
| 2,748,358 | A | * | 5/1956 | Johnston ................. 439/194 |
| 3,048,433 | A | | 8/1962 | Doetsch .................. 287/127 |
| 3,727,300 | A | * | 4/1973 | Madono .................. 228/164 |
| 3,737,300 | A | | 6/1973 | Cairns et al. ............. 75/0.5 |
| 4,679,206 | A | | 7/1987 | Burwell .................. 373/91 |
| 2005/0271114 | A1 | * | 12/2005 | Segger et al. ........... 373/92 |

OTHER PUBLICATIONS

PCT/US02/10125 International Publication No. WO 02/078945, Oct. 10, 2002.

* cited by examiner

*Primary Examiner* — Quang Van
(74) *Attorney, Agent, or Firm* — Waddey & Patterson, P.C.; James R. Cartiglia

(57) ABSTRACT

Disclosed herein is an electrode joint having a first carbon body having at least one end portion that includes a male tang with a convex tip and a second carbon body having a female socket with a concave base.

6 Claims, 3 Drawing Sheets

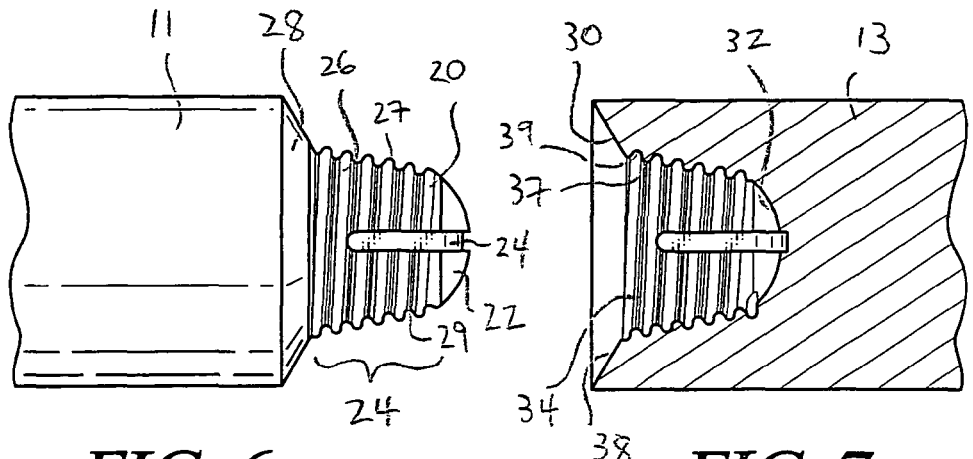
FIG. 6     FIG. 7
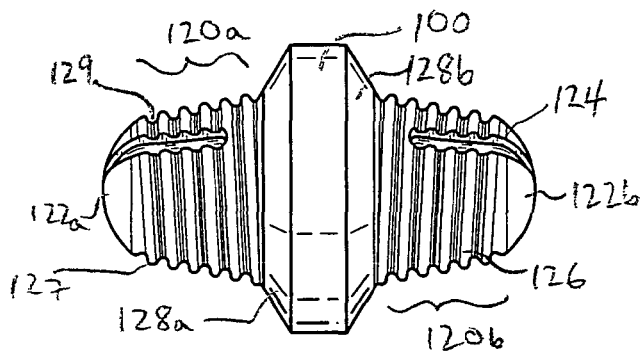 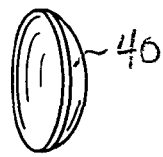
FIG. 8     FIG. 9
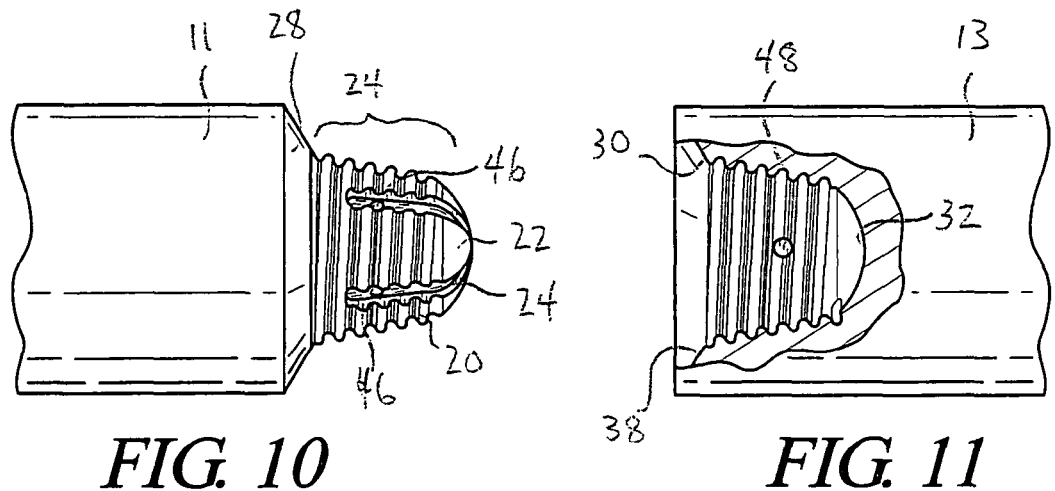
FIG. 10     FIG. 11

JOINT DESIGN

BACKGROUND OF THE INVENTION

1. Technical Field

The present invention relates to a carbon body design for use with electrode joints. More particularly, the invention concerns a unique design for the connecting ends of carbon bodies that facilitates the mechanical locking of electrode joints.

2. Background Art

Graphite electrodes are used in the steel industry to melt the metals and other ingredients used to form steel in electrothermal furnaces. The heat needed to melt metals is generated by passing current through one or a plurality of electrodes, usually three, and forming an arc between the electrodes and the metal. Electrical currents in excess of 100,000 amperes are often used. The resulting high temperature melts the metals and other ingredients. Generally, the electrodes used in steel furnaces are used in electrode columns, that is, a series of individual electrodes joined to form a single column. In this way, as electrodes are depleted during the thermal process, replacement electrodes can be joined to the column to maintain the length of the column extending into the furnace.

Conventionally, electrodes are joined into columns via a pin (sometimes referred to as a nipple) that functions to join the ends of adjoining electrodes. Typically, the pin takes the form of opposed male threaded sections, with at least one end of each of the electrodes comprising female threaded sections capable of mating with a male threaded section of the pin. Thus, when each of the opposing male threaded sections of a pin are threaded into female threaded sections in the ends of two electrodes, those electrodes become joined into an electrode column. Commonly, the joined ends of the adjoining electrodes, and the pin therebetween, are referred to in the art as a joint.

Alternatively, the electrodes can be formed with a male threaded protrusion or tang machined into one end and a female threaded socket machined into the other end, such that the electrodes can be joined by threading the male tang of one electrode into the female socket of a second electrode, and thus form an electrode column. The joined ends of two adjoining electrodes in such an embodiment is referred to in the art as a male-female joint.

Given the extreme thermal and mechanical stress that the electrode and the joint (and indeed the electrode column as a whole) undergo, detachment of the joint and subsequent loss of the electrode column below the detached joint is a recurring problem.

In so-called non-jammed joints, in which the threads of the pin and electrodes, or the two electrodes in a male-female joint, meet on only part of the thread surface, solutions have been proposed to reduce joint stress by affixing the male and female elements of the joint to each other. One method involves melting pitch or another material so that it infiltrates the area between the threads and carbonizes in the heat of the furnace, forming a bond between the joint elements.

For instance, in International application PCT/US02/10125, inventors Pavlisin and Weber disclose a "plug" formed of pitch and expandable graphite. When the plug is placed at the base of an electrode socket, the heat of the furnace causes the pitch to melt and the graphite to expand, forcing the melted pitch between the threads where it carbonizes and locks the joint together. Another joint locking system employed in the past has been to provide one or more holes in an electrode pin at or near each of its ends, and to position pitch in the holes. Again, the heat of the furnace causes the pitch to melt and flow across the threads where it carbonizes and locks the joint in position.

Although effective, these prior art methods for joint locking are maximally effective only in non-jammed threads, such as are illustrated in FIG. 5. In fully jammed threads in which the surfaces of the threads of one element fully contact the surfaces of the threads of the other element, such as those illustrated in FIG. 4, there is insufficient space between the threads for the pitch or other adherent composition to flow there.

There exists a need, therefore, to find a way to reduce the stress between joint elements that works for fully jammed and non-fully jammed graphite electrode joints.

SUMMARY OF THE INVENTION

It is an object of the present invention to provide a design for the connecting end portions of two carbon bodies that reduces stress between the carbon bodies.

It is an object of the present invention to provide a system for locking a joint for graphite electrodes.

It is another object of the present invention to provide a joint for graphite electrodes which is designed to better withstand the thermal and mechanical stresses on an electrode column in use, as compared to prior art-conventional graphite electrode joints.

It is yet a further object of the present invention to provide a joint for graphite electrodes which produces electrode column joints having improved strength and stability.

Still another object of the present invention is to provide a graphite electrode joint, having improved resistance to stub loss, defined as the loss of the part of the electrode column lying from the arc tip (that is, the end or tip of the electrode column extending into the furnace and from which the arc is formed) to and sometimes including the joint closest to the arc tip, as compared to art-conventional graphite electrode joints.

These objects and others that will become apparent to the artisan upon review of the following description can be accomplished by providing an electrode joint formed from first and second complementary elements, such as graphite electrodes, capable of being threadedly joined together to form the joint, wherein threaded elements of the electrode joints have rounded features. The threaded elements are either male tangs having convex tips and multiple threads with rounded crests and roots or female sockets having concave bases and threads with rounded crests and roots. To further reduce stress at the electrode joint, the end portions of the graphite electrodes may also have tapered shoulders between the threaded elements and the body of the graphite electrode.

Optionally, one of the threaded elements may have at least one slot (and preferably a plurality of slots) at least partially along its length; and may further include a source of a flowable adhesive in fluid communication with the slot. The source of flowable adhesive may further comprise a flow-enhancing material. Advantageously, the slot (and preferably a plurality of slots) extends radially across the tip of the threaded element (and continuing at least partially along its length) The source of flowable adhesive can further comprise a flow-enhancing material.

The flowable adhesive advantageously comprises pitch, and is present as a plug disposed at the base of the female threaded element. Alternatively, one of the first and second complementary elements may have an adhesive-containing shaft formed therein and in fluid communication with the slot.

It is to be understood that both the foregoing general description and the following detailed description provide embodiments of the invention and are intended to provide an overview or framework of understanding of the nature and character of the invention as it is claimed. The accompanying drawings are included to provide a further understanding of the invention and are incorporated in and constitute a part of the specification. The drawings illustrate various embodiments of the invention and together with the description serve to describe the principles and operations of the invention.

BRIEF DESCRIPTION OF THE DRAWINGS

FIG. 6 is a partial side view of a graphite electrode having a slotted male tang for receiving a flowable adhesive.

FIG. 7 is a partial side cross-sectional view of a graphite electrode having a slotted female socket for receiving a flowable adhesive.

FIG. 8 is a partial side view of an electrode pin having rounded shoulders and slots for receiving flowable adhesive.

FIG. 9 is a perspective view of an adhesive material plug for optional placement at the base of the female socket or the tip of the male tang.

FIG. 10 is a partial side view of a graphite electrode having a slotted male tang with bore holes for receiving flowable adhesive.

FIG. 11 is a partial side cross-sectional view of a graphite electrode having a female socket with a bore hole for receiving flowable adhesive.

DETAILED DESCRIPTION OF THE PREFERRED EMBODIMENT

Figure 1:
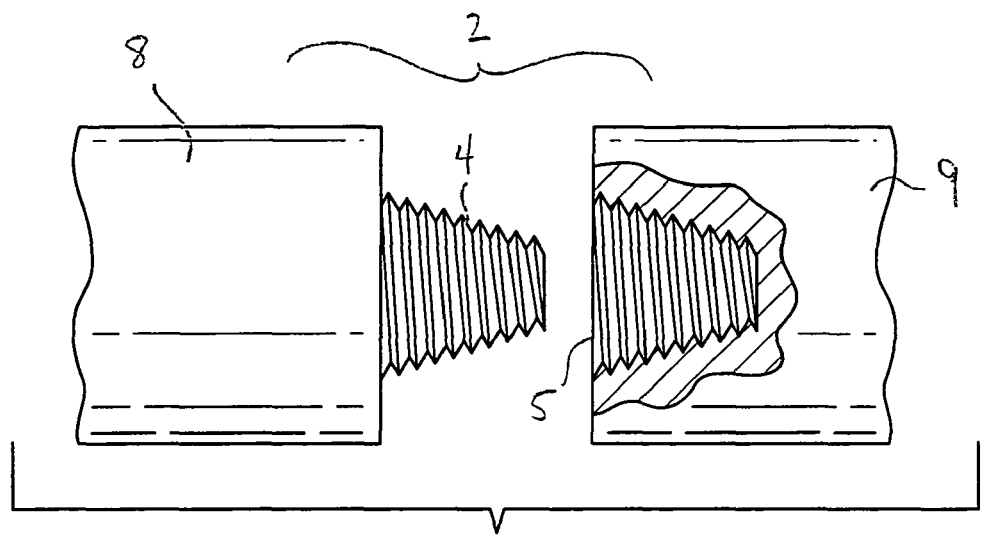
FIG. 1 is a partial side view of a prior art graphite electrode joint including a first electrode having a threaded element and a second electrode having a female socket into which the threaded element can be received.

Graphite electrodes can be fabricated by first combining a particulate fraction comprising calcined coke, pitch and, optionally, mesophase pitch or PAN-based carbon fibers into a stock blend. More specifically, crushed, sized and milled calcined petroleum coke is mixed with a coal-tar pitch binder to form the blend. The particle size of the calcined coke is selected according to the end use of the article, and is within the skill in the art. Generally, particles up to about 25 millimeters (mm) in average diameter are employed in the blend. The particulate fraction preferably includes a small particle size filler comprising coke powder. Other additives that may be incorporated into the small particle size filler include iron oxides to inhibit puffing (caused by release of sulfur from its bond with carbon inside the coke particles), coke powder and oils or other lubricants to facilitate extrusion of the blend.

Most preferably, the carbon fibers (when used) are preferably present at a level of about 0.5 to about 6 parts by weight of carbon fibers per 100 parts by weight of calcined coke, or at about 0.4% to about 5.5% by weight of the total mix components (excluding binder). The preferred fibers have an average diameter of about 6 to about 15 microns, and a length of preferably about 4 mm to about 25 mm, and most preferably less than about 32 mm. The carbon fibers used in the inventive process should preferably have a tensile strength of at least about 150,000 psi. Most advantageously, the carbon fibers are added to the stock blend as bundles, each bundle containing from about 2000 to about 20,000 fibers.

Preferably, the fibers are added after mixing of the particulate fraction and pitch has already begun. Indeed, in a more preferred embodiment, the fibers are added after at least about half the mix cycle has been completed, most preferably after at least about three-quarters of the mix cycle has been completed. For instance, if the mixing of the particulate fraction and pitch takes two hours (i.e., a mix cycle is two hours), the fibers should be added after one hour, or even ninety minutes, of mixing. Adding the fibers after the mixing has begun will help preserve fiber length (which can be reduced during the mixing process) and thereby the beneficial effects of the inclusion of fibers, which are believed to be directly related to fiber length.

As noted above, the particulate fraction can include small particle size filler (small is used herein as compared to the particle size of the calcined coke, which generally has a diameter such that a major fraction of it passes through a 25 mm mesh screen but not a 0.25 mm mesh screen, and as compared to the fillers conventionally employed). More specifically, the small particle size filler comprises at least about 75% coke powder, by which is meant coke having a diameter such that at least about 70%, and more advantageously up to about 90%, will pass through a 200 Tyler mesh screen, equivalent to 74 microns.

The small particle size filler can further comprise at least about 0.5% and up to about 25% of other additives like a puffing inhibitor such as iron oxide. Again, the additive should also be employed at a particle size smaller than that conventionally used. For instance, when iron oxide is included, the average diameter of the iron oxide particles should be such that they are smaller than about 10 microns. Another additional additive which can be employed is petroleum coke powder, having an average diameter such that they are smaller than about 10 microns, added to fill porosity of the article and thus enable better control of the amount of pitch binder used. The small particle size filler should comprise at least about 30%, and as high as about 50% or even 65% of the particulate fraction.

After the blend of particulate fraction, pitch binder, etc. is prepared, the body is formed (or shaped) by extrusion though a die or molded in conventional forming molds to form what is referred to as a green stock. The forming, whether through extrusion or molding, is conducted at a temperature close to the softening point of the pitch, usually about 100° C. or higher. The die or mold can form the article in substantially final form and size, although machining of the finished article is usually needed, at the very least to provide structure such as threads. The size of the green stock can vary; for electrodes the diameter can vary between about 220 mm and 750 mm.

After extrusion, the green stock is heat treated by baking at a temperature of between about 700° C. and about 1100° C., more preferably between about 800° C. and about 1000° C., to carbonize the pitch binder to solid pitch coke, to give the article permanency of form, high mechanical strength, good thermal conductivity, and comparatively low electrical resistance, and thus form a carbonized stock. The green stock is baked in the relative absence of air to avoid oxidation. Baking should be carried out at a rate of about 1° C. to about 5° C. rise per hour to the final temperature. After baking, the carbonized stock may be impregnated one or more times with coal tar or petroleum pitch, or other types of pitches or resins known in the industry, to deposit additional coke in any open pores of the stock. Each impregnation is then followed by an additional baking step.

After baking, the carbonized stock is then graphitized. Graphitization is by heat treatment at a final temperature of between about 2500° C. to about 3400° C. for a time sufficient to cause the carbon atoms in the coke and pitch coke binder to transform from a poorly ordered state into the crystalline structure of graphite. Advantageously, graphitization is performed by maintaining the carbonized stock at a temperature of at least about 2700° C., and more advantageously at a temperature of between about 2700° C. and about 3200° C. At these high temperatures, elements other than carbon are volatilized and escape as vapors. The time required for maintenance at the graphitization temperature using the process of the present invention is no more than about 18 hours, indeed, no more than about 12 hours. Preferably, graphitization is for about 1.5 to about 8 hours. Once graphitization is completed, the finished article can be cut to size and then machined or otherwise formed into its final configuration.

When the electrode joint is one utilizing a pin, the pin is formed in a similar manner, although the number of pitch impregnation/bake steps may be higher for a pin in order to provide greater strength. Once formed, the finished article is then machined or otherwise formed into its final configuration for use as a pin.

When a male-female electrode joint is desired, the male tang (and, by extension, the female socket) should advantageously be dimensioned such that the tang will provide the required strength in use. More specifically, the ratio of the length of the male tang to the diameter of the electrode (referred to as the tang diameter factor) of at least about 0.60 is desirably in creating a male-female electrode joint having improved stability and commercially acceptable performance. Moreover, a ratio of a factor defined by the ratio of the diameter of the male tang at its base to the male tang length (referred to as the tang diameter factor) should be no greater than 2.5 times the tang factor for an especially effective joint with a tang factor of about 0.60. Indeed, the tang diameter factor should most preferably vary with the tang factor, such that when a joint with a tang factor higher than 0.60 is produced, the tang diameter factor of the joint should be lower than 2.5 times the stub factor. More specifically, for every 0.01 higher than 0.60 that the tang factor of a joint is, the maximum tang diameter factor should be about 0.016 lower. Another joint characteristic that can come into play in designing an effective male-female joint is referred to herein as the taper factor, which is defined as the ratio of the taper (expressed in degrees) of the male tang to the tang factor, which should be at least about 15, where the tang factor is 0.85, and should also vary as joints with different tang factors are produced. For instance, for every 0.01 lower than 0.85 that the tang factor of a joint is, the minimum taper factor should be about 1.25 higher.

Referring now to the drawings, an electrode joint according to the present invention is denoted by the reference numeral 10. While joint 10 is shown in the drawings in a specific orientation, it will be recognized that joint 10 will assume a variety of orientations while in use. In addition, for simplicity, not all reference numerals are provided in all drawing figures.

As illustrated in FIG. 1, the electrode joint of the prior art comprises a graphite electrode joint 2, having a threaded element 4 (such as a pin) at the end portion of one electrode 8 and a female socket 5 at the end portion of the adjoining electrode 9, such that threaded element 4 can threadedly engage female socket 5 to form joint 2.

Referring now to FIGS. 2, 3, 6 and 7, the inventive joint design 10 also includes a first element or carbon body, such as graphite electrode 11 and a complementary second element or carbon body, such as graphite electrode 13 each having an end portion. The end portion of the first element 11 has a male tang 20 that comprises a curved or convex tip 22 and the end portion of the second element 13 has a female socket 30 comprising a curved or concave base 32.

The end portion of the first element 11 may also have a threaded portion 24 extending from the convex tip 22, the threaded portion having a number of threads 26 with rounded crests 27 and roots 29. Similarly, the end portion of the second element 13 may have a threaded portion 34 with a number of threads 36, each having rounded crests 37 and roots 39.

Additionally, the end portions of first and second elements 11 and 13 may also have complementary tapered shoulders 28 and 38 extending outward from the threaded portion 24 of the male tang 20 of the electrode 11, and from the threaded portion 34 of the female socket 30 to the body 18 of the electrode 13 respectively.

The most preferred embodiment of the electrode joint has a first element 11 having all novel features: convex tip 22, rounded threads 26, and tapered shoulder 28; and a second element 13 having all novel features: concave socket 32, rounded threads 36, and tapered shoulder 38. However, alternative embodiments also include joints whose elements have only some partial combination of these features. For example, a joint with elements having only the convex tip 22 and concave base 32 without the other inventive features, joints whose elements have only tapered shoulders 28 and 38, and joints whose elements have only the inventive feature comprising threads 26 and 38 with rounded crests 27 and 37 and roots 29 and 39 are novel and are covered by this invention. Of course, if the first element making up a joint has a novel feature, the second element connecting to that first element must have the complementary novel feature so that they can be effectively joined.

While the electrode joint is formed by causing the threaded portion 24 of the first element 11 to be received within the threaded socket portion 34 of the second element 13, it is not necessary that the tip 22 of male tang 20 and the base 32 of female socket 30 engage. Rather, male tang 20 is said to be received within female socket 30 even when the concave tip 22 is located just partially within the base concavity 32.

The male end portion of an electrode 11 complements the female end portion of an electrode 13 so that they can be threaded to form a joint 10. Although it is not necessary that any of the elements closely abut their complement to form a joint 10, in the preferred embodiment, joint 10 is formed when at least one feature makes up with its complement. The inventive joint design allows for several different ways in which a joint is formed: abutting shoulders 28 and 38, jammed threads 26 and 36, or abutting tip 22 and base 32.

Figure 5:
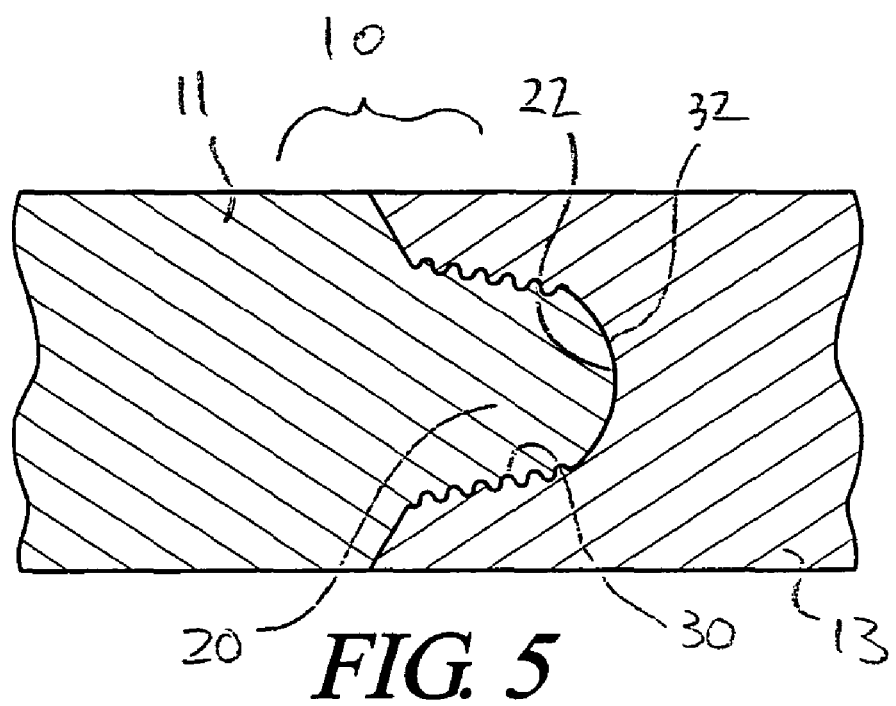
FIG. 5 is a partial side cross-sectional view of a non-jammed graphite electrode joint.

As previously stated, and as illustrated in FIG. 5, convex tip 22 of non-jammed male tang 20 may make up with, or be closely received within, concave base 32 of female socket 30. In this case, the convex shape of the tip 22 and the complementary concave shape of the base 32 serve not only to create a tighter fit of the tang 20 in the socket 30 than the prior art, but also to distribute the stress across a greater surface area, thereby creating a stronger joint.

Figure 4:
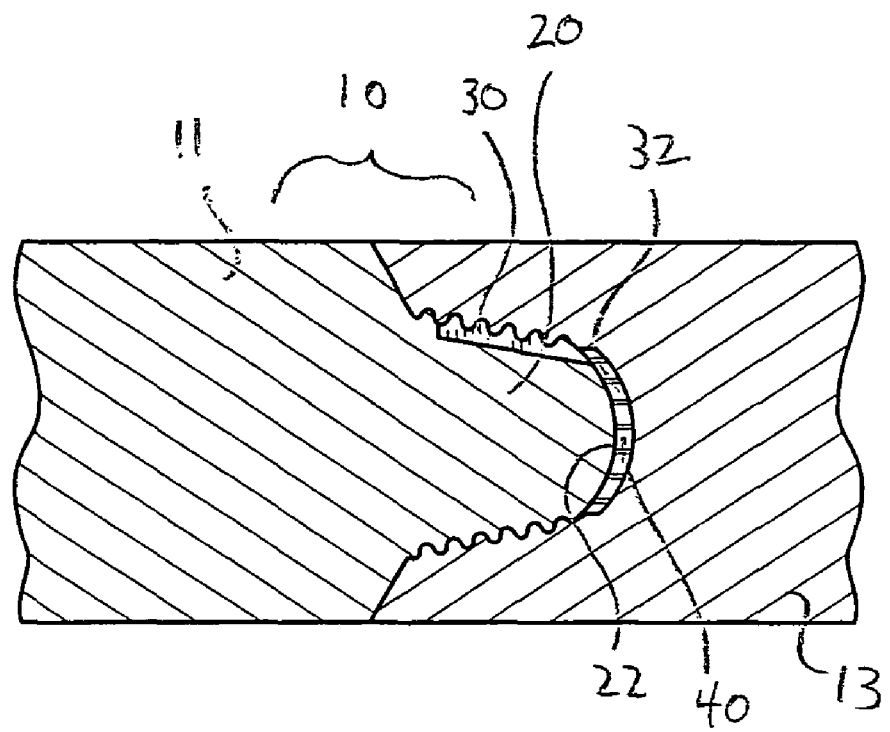
FIG. 4 is a partial side cross-sectional view of a fully jammed male-female graphite electrode joint which further includes a plug of flowable adhesive between the tip of the male tang and base of the female socket.

Similarly, as illustrated in FIG. 4, the complementary end portions of carbon members 11 and 13 may make up at their threaded portions 24 and 34. Male tang 20 is received within female socket 30 by screwing the complementary end portions together using rounded threads 26 and 36 until the threads are fully jammed or engaged. The rounded nature of the crests 27 and 37 and roots 29 and 39 of threads 26 and 36 strengthens the joint by distributing the stress over a greater surface area.

Finally, when tang 20 is not fully jammed, the joint 10 may make up at complementary shoulders 28 and 38, where shoulders 28 and 38 abut so that convex shoulder 28 is closely nested within concave shoulder 38. The taper of the shoulders reduces joint stress by enabling the shoulders to more closely connect and by increasing the surface area across which the stress between the complementary features is spread when they abut.

Figure 2:
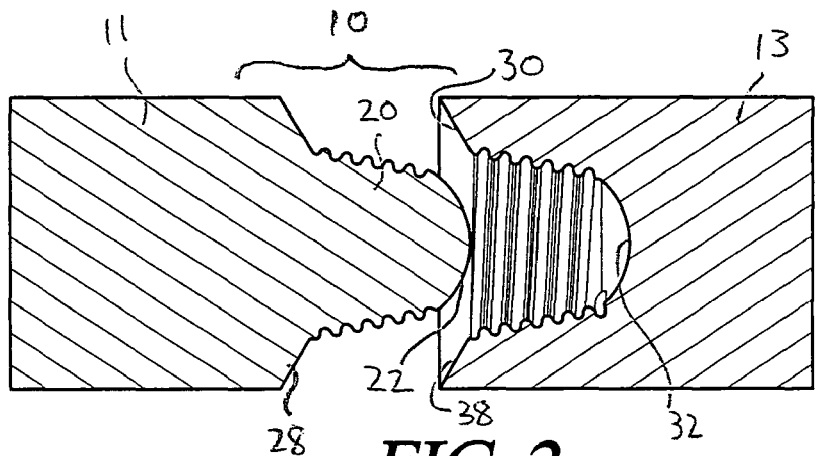
FIG. 2 is a partial side cross-sectional view of a graphite electrode with a male tang having rounded features and tapered shoulders being received into a female socket of a second graphite electrode.
Figure 3:
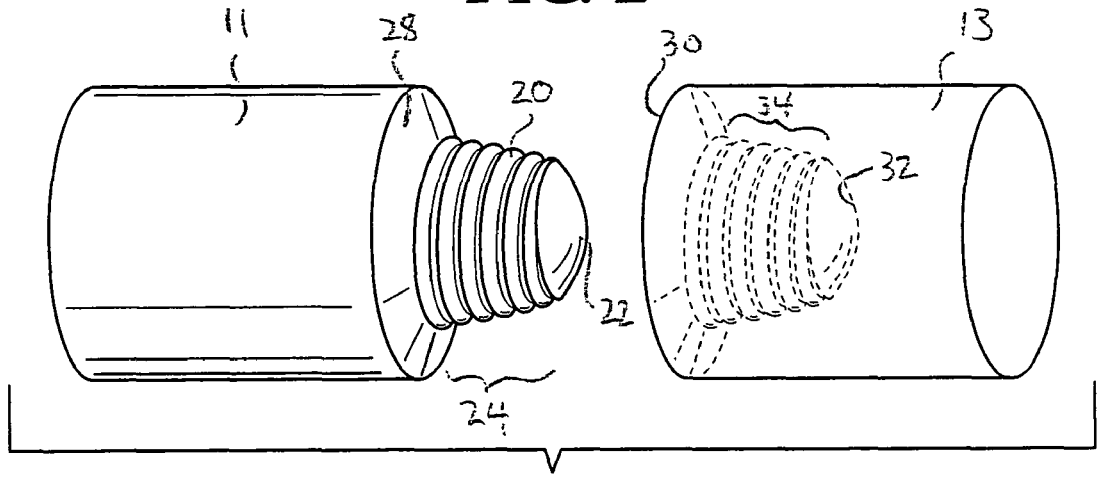
FIG. 3 is a partial side perspective view of a graphite electrode with a male tang having rounded features and tapered shoulders being received into the female socket of a second electrode (shown in phantom), also having rounded features and tapered shoulders.

The novel features in the joint design of the present invention are effective in joint stress reduction and stub loss prevention, and can be used with either graphite electrodes having male tangs 20, as in FIGS. 2 and 3, or using a pin 100 as illustrated in FIG. 8. Pin 100 comprises opposing male elements 110a and 110b, each having a threaded portion 120a and 120b, respectively, and a rounded tip, 122a and 122b, respectively. Shoulders 128a and 128b of pin 100 can be tapered and pin 100 can comprise threads 126 with rounded crests 127 and roots 129.

As noted above, a flowable adhesive may be used to further improve the strength of joint 10, especially when joint 10 has a fully jammed male tang 20 and female socket 30, as illustrated in FIG. 4, such that each crest 27 or root 29 of the threads 26 of male tang 20 abuts a crest 37 or root 39 of the threads 36 of female socket 30.

In order to use the flowable adhesive, male tang 20 should be formed such that at least one slot or groove 24 extends at least partially along its length, as illustrated in FIG. 6. In the preferred embodiment, a plurality of slots 24 extend at least partially along the length of male tang 20; indeed, in the most preferred embodiment, four slots 24 are arrayed along the length of male tang 20, with each slot disposed about the circumference of male tang 20 at approximately 90° intervals (not shown). Most preferably, slots 24 extend radially across the tip 22 of male tang 20.

A source of an adhesive material is disposed in joint 10, in a location contiguous with slot(s) 24. For instance, an adhesive material plug 40, illustrated in FIG. 9, can be placed at the base of joint 10, as shown in FIG. 4, provided slot(s) 24 extend completely to the tip 22 of male tang 20, where the tip 22 of male tang 20 approaches the base 32 of female socket 30. Adhesive material 40 should be such that, under the conditions to which joint 10 is exposed, adhesive material 40 flows along slot(s) 24 and forms an adhesive bond between threads 26 of male tang 20 and threads 36 of female socket 30, to thereby work to prevent unscrewing of joint 10. Advantageously, slot(s) 24 do not extend all the way to the shoulder 28, to avoid flow of adhesive material out of joint 10. In the case of a pin joint, pin 100 can comprise slots 124 for flow of a flowable adhesive.

Suitable materials useful as adhesive material employed in source 40 include cements and resins having melting temperatures below the temperature to which joint 10 is exposed in the furnace, but higher than the typical storage temperature of electrodes 11 and 13 (to prevent premature melting). The suitable cements or resins should be those which cure or coke at the furnace temperatures, such that, after melting and flowing about threads 26 and 36, the material cures or cokes to form the desired bond. Most preferably, the material comprises pitch, which has a melting temperature below the temperature to which joint 10 is exposed in the furnace, but higher than the typical storage temperature of electrodes 11 and 13; pitch also cokes at the furnace temperatures, such that, after melting and flowing about threads 26 and 36, it cokes to bond electrodes 11 and 13 of joint 10 together.

Source 40 can comprise other elements besides the adhesive material itself. For instance, a foaming agent such as oxalic acid, along with metallurgical pitch and carbon fine particles, can be included with the adhesive material, to facilitate flow of the adhesive material along slot(s) 24. Other materials, such as cements, binders, etc. may also be included, if desired.

Although the source of adhesive material can be provided in the form of a plug 40 disposed at the base of joint 10, other locations for the source of adhesive material 40 can also be contemplated. For instance, as shown in FIG. 10, one or more shafts or bore holes 46 can be formed in male tang 20, such that the entrance to each bore hole 46 lies in fluid communication with slot(s) 42; bore hole(s) 46 can have the source of adhesive material therewithin, such that in the furnace the adhesive material flows out of bore hole(s) 46 and along slot(s) 24. Similarly, shafts or bore hole(s) 48 can be formed in female socket 30, as shown in FIG. 11, provided the entrances to bore hole(s) 48 open into slot(s) 24 formed in male tang 20.

Thus, by use of the inventive joint design, carbon bodies are more closely joined and stress is distributed across a greater surface area so that joint stress and stub loss are reduced beyond the level of the prior art.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A graphite electrode for melting metals in an electrothermal furnace by passing current through comprising: a body having first and second end portions, each end portion comprising a threaded element, at least one of the threaded elements comprising a male tang having a convex tip, wherein each of the threaded elements further includes a threaded portion comprising a plurality of threads having rounded crests and roots, and further wherein each of the first and second end portions comprises a tapered shoulder extending outward from each of the threaded elements.

2. The graphite electrode of claim 1, wherein one of the threaded elements comprises a female socket having a concave base.

3. The graphite electrode of claim 1, wherein one of the threaded elements has a length partially along which at least one slot extends.

4. The graphite electrode of claim 3, wherein one of the threaded elements further comprises at least one adhesive containing shaft formed therein, the at least one shaft in alignment with the slot.

5. The graphite electrode of claim 1, wherein the carbon body comprises a graphite electrode.

6. The graphite electrode of claim 1, wherein the carbon body comprises a pin.

* * * * *